(12) United States Patent
Lee

(10) Patent No.: US 11,298,590 B2
(45) Date of Patent: Apr. 12, 2022

(54) TECHNIQUES FOR SYNCHRONIZING CREWS IN COMPETITIVE ROWING

(71) Applicant: Alexandra Lee, Needham, MA (US)

(72) Inventor: Alexandra Lee, Needham, MA (US)

(*) Notice: Subject to any disclaimer, the term of this patent is extended or adjusted under 35 U.S.C. 154(b) by 526 days.

(21) Appl. No.: 16/514,024

(22) Filed: Jul. 17, 2019

(65) Prior Publication Data

US 2021/0016135 A1 Jan. 21, 2021

(51) Int. Cl.
*A63B 69/06* (2006.01)
*A63B 24/00* (2006.01)
*A63B 71/06* (2006.01)
*G01P 15/00* (2006.01)

(52) U.S. Cl.
CPC ...... *A63B 24/0006* (2013.01); *A63B 24/0062* (2013.01); *A63B 69/06* (2013.01); *A63B 71/0686* (2013.01); *G01P 15/00* (2013.01); *A63B 2024/0015* (2013.01); *A63B 2069/066* (2013.01); *A63B 2071/0688* (2013.01)

(58) Field of Classification Search
CPC . A63B 69/06; A63B 24/0006; A63B 24/0062; A63B 2024/0009; A63B 2024/0012; A63B 2024/0015; A63B 71/0686; G01P 15/00
See application file for complete search history.

(56) References Cited

U.S. PATENT DOCUMENTS

| | | | |
|---|---|---|---|
| 4,052,951 A | 10/1977 | Farr | |
| 4,220,996 A | 9/1980 | Searcy | |
| 5,016,557 A | 5/1991 | Miller | |
| 5,067,426 A | 11/1991 | Vespoli et al. | |
| 5,099,689 A | 3/1992 | McGinn | |
| 5,188,048 A | 2/1993 | Vespoli et al. | |
| 5,279,239 A | 1/1994 | Vespoli et al. | |
| 5,382,210 A | 1/1995 | Rekers | |
| 5,421,285 A | 6/1995 | Shaper | |
| 5,474,008 A | 12/1995 | Vespoli et al. | |
| 5,662,062 A | 9/1997 | Veverka | |
| 6,253,932 B1 | 7/2001 | Lindsey | |
| 6,980,118 B2* | 12/2005 | Buvac | B63B 49/00 482/73 |
| 7,114,398 B2 | 10/2006 | Haines | |
| 7,207,853 B2 | 4/2007 | Spencert et al. | |
| 7,708,610 B1 | 5/2010 | Horan et al. | |
| 8,608,626 B2 | 12/2013 | Campbell | |
| 8,968,041 B2 | 3/2015 | Rubbo | |

(Continued)

*Primary Examiner* — Hai L Nguyen

(74) *Attorney, Agent, or Firm* — Fish & Richardson P.C.

(57) ABSTRACT

Disclosed are computer-implemented techniques for providing immediate feedback to rowers for training and other activities to improve competitiveness of rowing crews. The techniques include a computing device receiving from a set of stroke unit devices, data that represent changes in acceleration of users' seats corresponding to users' strokes, receiving reference stroke data corresponding to a reference user's stroke, and generating from the received data from the set of stroke unit devices and the received reference strokes data, feedback data that correspond to relative stroke timing differences of each of the users, relative to the reference stroke, and transmitting the generated feedback data to user devices according to a feedback mechanism. Various feedback mechanisms are disclosed including visual, audio and tactical feedback mechanisms.

30 Claims, 8 Drawing Sheets

(56) References Cited

U.S. PATENT DOCUMENTS

| | | |
|---|---|---|
| 9,139,274 B2 | 9/2015 | West |
| 9,394,044 B1 | 7/2016 | Horan |
| 9,896,175 B2 | 2/2018 | Galletta, Jr. |
| 9,968,822 B2 | 5/2018 | Hoover |
| 10,016,158 B2 | 7/2018 | Donohoe |
| 10,252,134 B2 * | 4/2019 | Postelnik ................ G09B 9/06 |
| 2005/0170711 A1 | 8/2005 | Spencer et al. |
| 2005/0215870 A1 | 9/2005 | Rademaker |
| 2006/0116037 A1 | 6/2006 | Squires |
| 2008/0261782 A1 | 10/2008 | Campbell |
| 2012/0035216 A1 | 2/2012 | Palmer et al. |
| 2012/0066934 A1 | 3/2012 | West |
| 2013/0095711 A1 | 4/2013 | Rubbo |
| 2016/0263438 A1 | 9/2016 | Donohoe |
| 2016/0271441 A1 | 9/2016 | Hoover |
| 2017/0144047 A1 | 5/2017 | Crawford |
| 2017/0242405 A1 | 8/2017 | Shirai |
| 2018/0272218 A1 * | 9/2018 | Mattocks ............... B63H 16/04 |

* cited by examiner

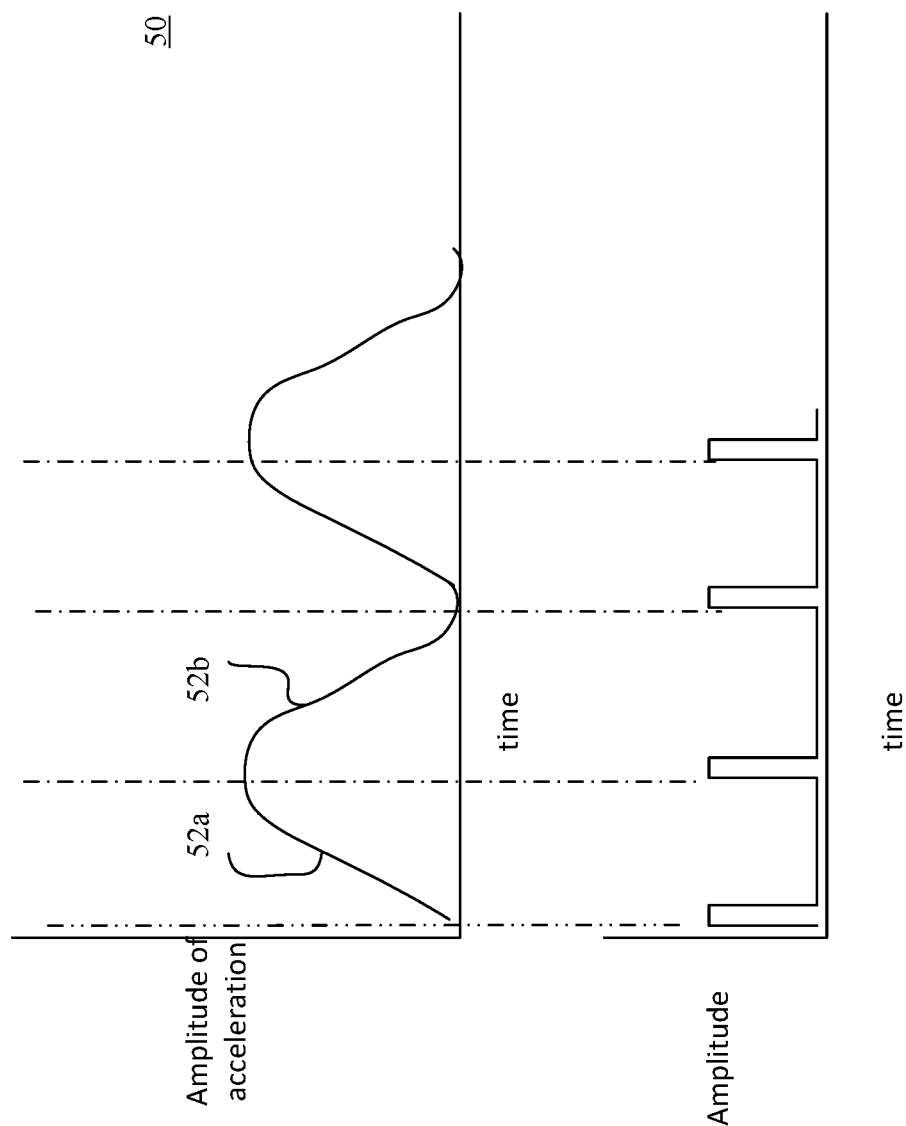

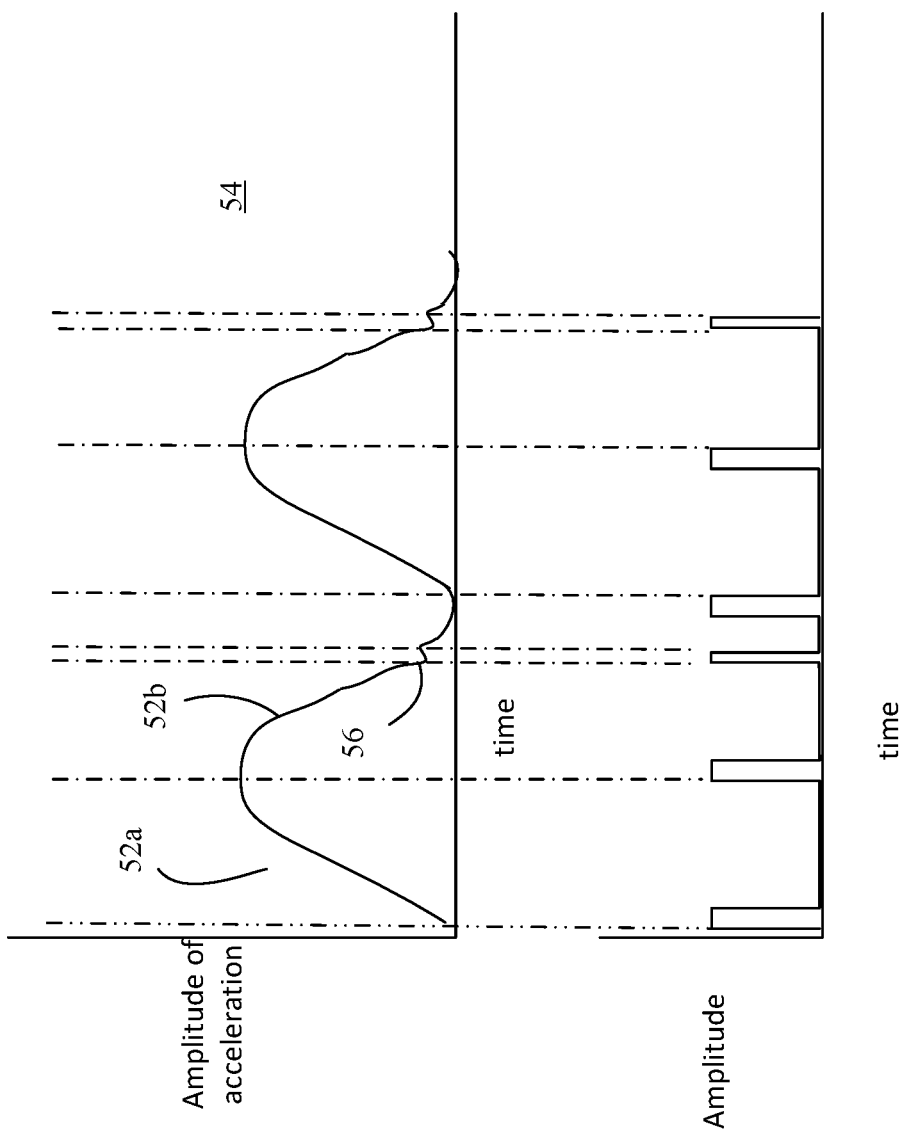

TECHNIQUES FOR SYNCHRONIZING CREWS IN COMPETITIVE ROWING

BACKGROUND

This disclosure relates to techniques to synchronizing strokes made by crews in the competitive sport of rowing.

In the sport of rowing, typically there are an even number of crew members, with each crew member using a single oar, with the same number of crew members rowing on each side of a rowboat. Typically, there is a person referred to as a coxswain that sits typically at stern (rear) of the boat, whose primary job is to steer the rowboat, but also to motivate the crew.

Rowboats are typically configured for crews of two, four or eight crew members (referred to herein as rower(s)) plus the coxswain (especially on the four and eight crews). Rowboats have sliding seats that work with the rowers' rowing motions referred to as a "stroke." A stroke starts when a rower sits at "the catch", the most compressed position in a stroke. Holding the oar, a rower extends her legs and pushing her feet against a footboard causes the sliding seat to move towards the bow of the rowboat. The rower using her body and arms finishes the stroke essentially using her oar to push water from the bow to the stern of the rowboat, propelling the rowboat through the water. A "recovery" portion of the stroke is when the rower takes the blade portion of the oar out of the water and moves the seat back up the slide towards stern to position the oar and start the stroke again.

Overall performance of a rowboat involves a significant number of factors. These factors include each rowers' physiological ability and physical characteristics of the rowboat. An important mechanism to maximize efficiency and thus velocity (speed with short path direction) of the rowboat through the water involves synchronizing the strokes of the crew members, i.e., the strokes are synchronized when all of the oar blades are at the same relative positions during strokes.

Various synchronization techniques are known. One technique to synchronize crew members is for the crew members to listen to the coxswain. The coxswain can motivate the rowers by commands that are often delivered with a microphone and speaker system wired through the boat. Other techniques involve timing devices. The coxswain often has devices that display stroke rates (strokes/minute) of the stroke and splits (estimated time/500 m) so that they can see overall how fast the boat is going. The coxswain can use that information to make calls in the boat.

SUMMARY

In rowing, crews of fours (four persons) or eights (eight persons) especially need to work together to move a rowboat. As mentioned above, synchronization of the rowers' strokes is important for efficiency. While synchronization techniques are known, described are techniques that will assist rowers in meeting a goal being for the rowers to be in 'perfect time' with each other and move as one unit.

According to an aspect, a computer-implemented method for providing immediate feedback to rowers includes receiving from a set of stroke unit devices data that represent changes in acceleration of users' seats corresponding to users' oars being placed into water, receiving reference stroke data corresponding to reference user's oar being placed into the water, generating from the received data from the set of stroke unit devices and the received reference strokes data, feedback data that correspond to relative stroke timing differences relative to the reference stroke, and transmitting the generated feedback data to user devices according to a feedback mechanism.

According to an additional aspect, a computer-implemented method for providing immediate feedback to rowers includes receiving from a set of stroke unit devices data that represent changes in acceleration of a user's seat, with a first one of the changes being an indication of a start of a stroke and a second one of the changes being an indication of a completion of a stroke, receiving data that represent start points of reference strokes and completion points of the reference strokes, generating from the received data from the set of stroke unit devices and the data that represent the reference strokes, feedback data that correspond to relative stroke timing differences relative to the reference stroke, and transmitting the generated feedback data to user devices according to a feedback mechanism.

According to an additional aspect, an apparatus includes a processor device, memory operatively coupled to the processor device, and a storage device storing a computer program product for configuring the device to receive from a set of stroke unit devices data that represent changes in acceleration of users' seats corresponding to users' oars being placed into water, receive reference stroke data corresponding to reference user's oar being placed into the water, generate from the received data from the set of stroke unit devices and the received reference strokes data, feedback data that correspond to relative stroke timing differences relative to the reference stroke, and transmit the generated feedback data to user devices according to a feedback mechanism.

According to an additional aspect, a computer program product tangibly stored on a non-transitory hardware storage device the computer program product includes executable instructions to cause an apparatus to receive from a set of stroke unit devices data that represent changes in acceleration of users' seats corresponding to users' oars being placed into water, receive reference stroke data corresponding to reference user's oar being placed into the water, generate from the received data from the set of stroke unit devices and the received reference strokes data, feedback data that correspond to relative stroke timing differences relative to the reference stroke, and transmit the generated feedback data to user devices according to a feedback mechanism.

The following are some of the additional features of one or more of the above aspects.

Receiving from the set of stroke units and receiving reference stroke data each further includes receiving data corresponding to first changes in acceleration as a measure of a rower at the catch point in the stroke, and the second changes in acceleration as a measure of a rower at the end point of the stroke. The generated feedback data indicates whether the rower is ahead, in synch or behind the start of each of the reference strokes. The reference strokes are a Stroke Rower's strokes, and the method generates the feedback data for each stroke unit device in the set of stroke unit devices.

The mechanism is one or more of a visual feedback mechanism, an audio feedback mechanism and a tactile feedback mechanism. The mechanism is a visual feedback mechanism that is rendered on a display unit mounted on a rigger portion of the rowboat, with the display configured to show a visual indication of a stroke difference, indicating to the corresponding rower how much the rower is behind or ahead of the Stroke Rower.

The mechanism is an audio feedback mechanism that is rendered through an acoustic transducer device that is configured to render an indication of a stroke difference as a set of tones. The set of tones includes a first tone corresponding to the Stroke Rower's catch and finish points and a second, different tone that corresponds to the rower's catch and finish points. The time of arrival of the set of Stroke Rower's tones relative to the time of arrival of the rower's tones determine whether the rower's stroke is ahead of or behind or synchronized with the stoke of the of Stroke Rower.

The mechanisms is a tactile feedback mechanism that causes a tactical actuator to render a tactile sensation to a user according to whether the rower is behind or ahead of the Stroke Rower.

In some aspects, the first change in acceleration is a measure of a rower at the catch point in the stroke, and the second change in acceleration is a measure of a rower at the end point of the stroke, and the aspect further includes receiving from the set of stroke unit devices data that represent changes in acceleration of the users' seats corresponding to users' oars being placed into water, wherein receiving the reference stroke data further includes data corresponding to reference user's oar being placed into the water and generating further includes generating feedback from the received data from the set of stroke unit devices and the data that represent the reference strokes that correspond to relative stroke timing differences at each of the rowers' catch points, end points, and point where the oars are being placed into water relative to the reference stroke catch points, end points, and point where the oars are being placed into water.

One or more of the above aspects may include one or more of the following advantages.

One or more of the above aspects provide techniques to synchronizing strokes made by crews in the competitive sport of rowing, assisting rowing crews of fours (four persons) or eights (eight persons) to meet a goal of being in 'perfect time' with each other and move as one unit.

As rowboats have sliding seats that work with the rowers' "strokes," placement of accelerometers on rowers seats allow the accelerometer to better capture a stroke start, e.g., when a rower sits at "the catch" and the end of the stroke, while introducing a third point being essentially when the rower places the oar back into the water. These techniques when used as a training program enable an overall improvement in performance of a rowboat by synchronizing the strokes of crew members, and thus assist crews, especially of fours (four persons) or eights (eight persons) in meeting the goal of the rowers being in 'perfect time' with each other and move as one unit.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5, 5A are exemplary fictitious waveforms that may be generated by an accelerometer device during a stroke.

FIGS. 6, 6A are exemplary fictitious timing signals that could be produced from the waveforms of FIGS. 5, 5A, respectively, that may be generated by an accelerometer device during a stroke.

DETAILED DESCRIPTION

Figure 1:
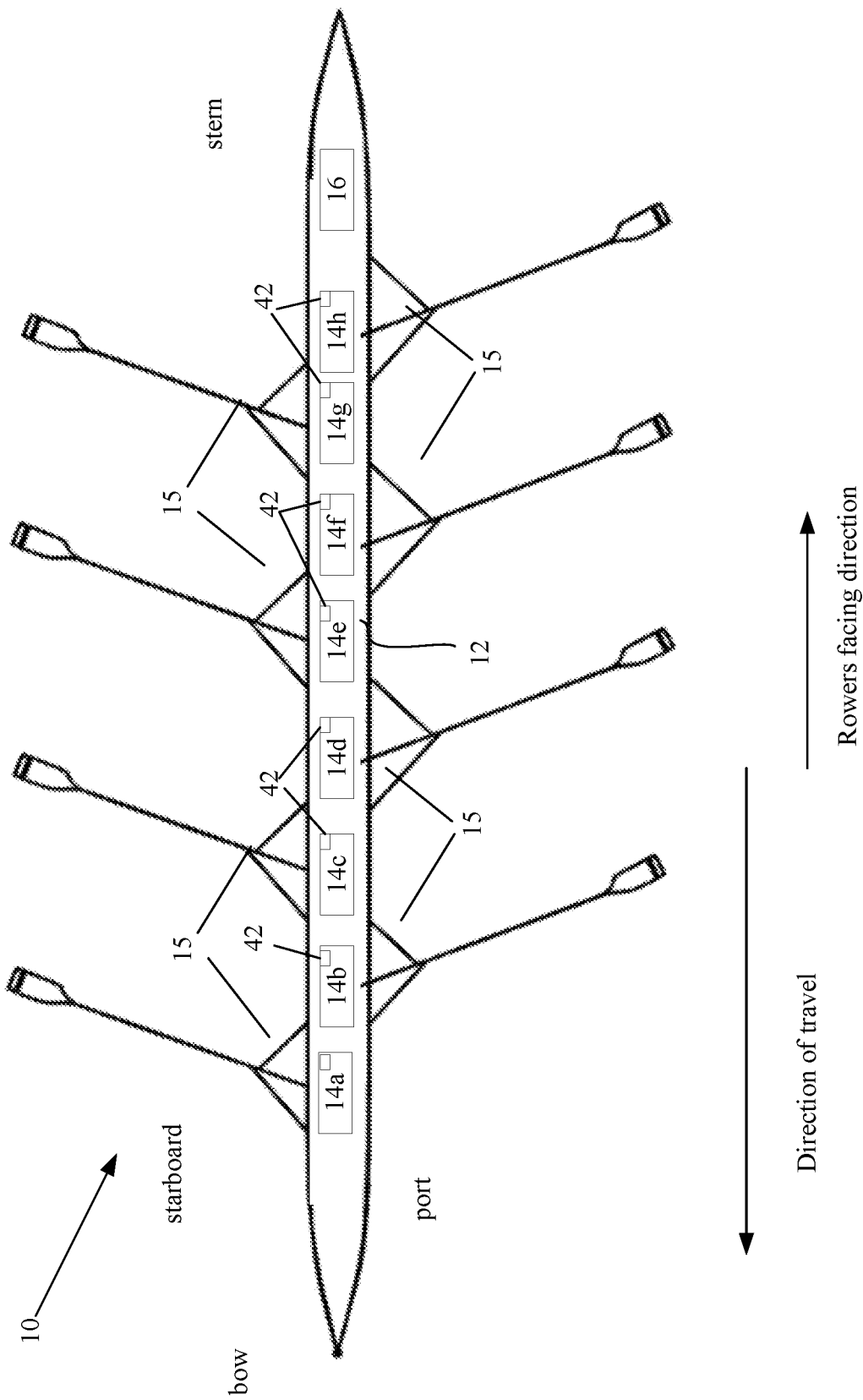
FIG. 1 is a top view of a rowboat with a crew of eight rowers.
Figure 4:
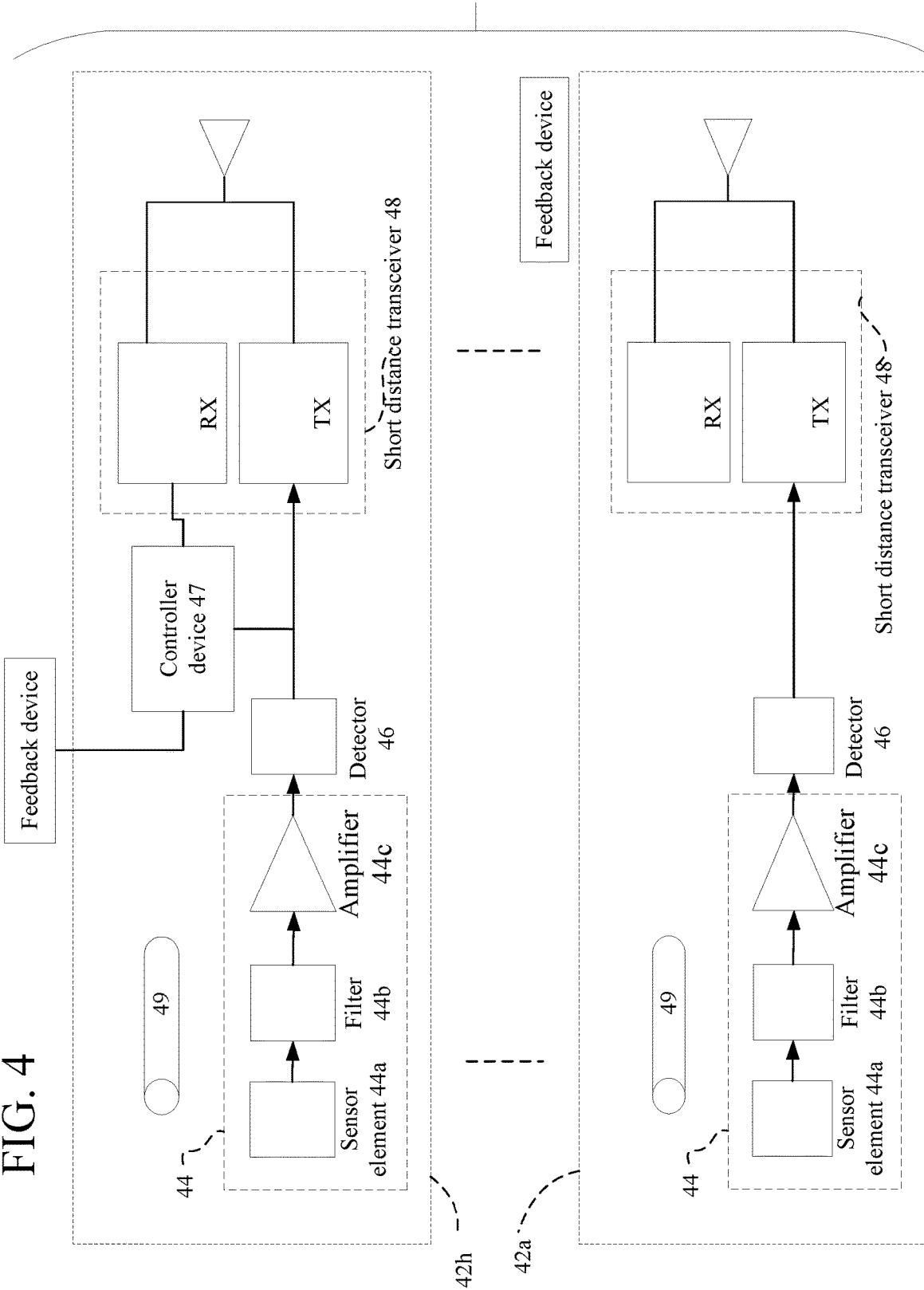
FIG. 4 is a block diagram of a set of stroke unit devices.

Referring to FIG. 1 a rowboat 10 includes a hull 12 configured for an eight person rowing crew. Rowboat 10 is depicted as having eight rower stations 14a-14h, four on each side (port and starboard sides) of the boat 10. Each rower station 14a-14h includes adjustable rowing riggers 15 that are attached by conventional hardware fittings (not shown) through the hull 12 to interior mount elements. The rowing riggers 15 may be adjustable to the particular dimensions and requirements of an oar and the rower (i.e., crew member). The rowboat 10 includes a coxswain station 16 placed near the stern (rear) of the hull 12. The arrow pointing to the front (bow) of the boat illustrates the direction of travel. Various hull configurations and shell constructions could be used. However, the particulars of the rowboat construction are not important for understanding the disclosed subject matter. Each rower station 14a-14h also includes a stroke unit device 42 (FIG. 4).

Figure 2:
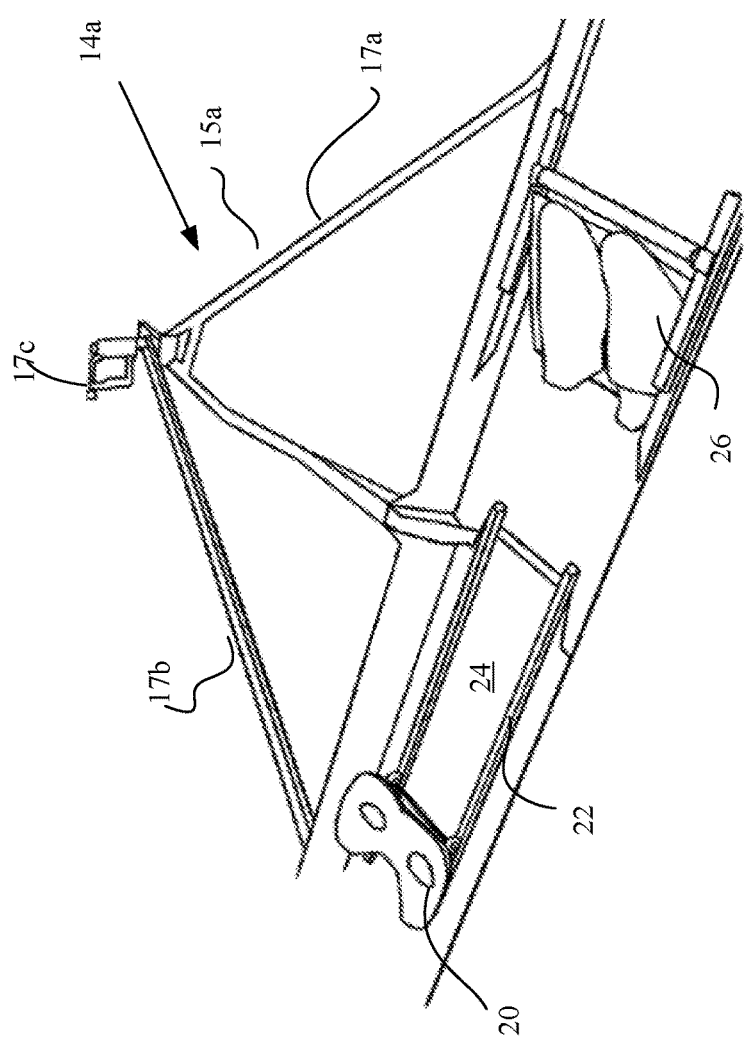
FIG. 2 depicts some details of a typical rower station.

Referring to FIG. 2, rower station 14a (representative of the stations 14a-14h of FIG. 1) is shown. Rower station 14a (as well as rower stations 14b-14h) includes a seat 20 that has wheels (not shown), attached to the underside of the seat 20 (FIG. 3), which engage with a track set 22 mounted on the top of a seat deck 24. The rower station 14a includes a corresponding rigger 15a that includes a forward member 17a and a rear member 17b that support an oarlock 17c. The rower station 14a also includes a footboard 26. The rower stations 14a-14h will each include an oar not shown, but see FIG. 1.

Figure 3:
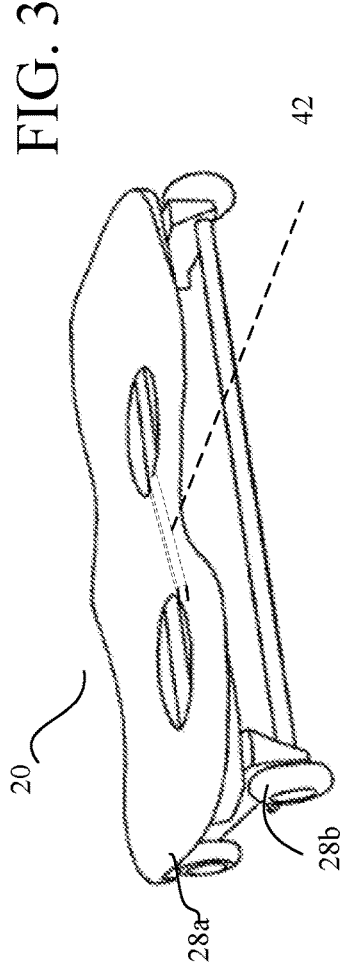
FIG. 3 illustrates a seat.

Referring to FIG. 3, the seat 20 includes two pairs 28a, 28b of wheels. One pair 28a is positioned at the front and one pair 28b is positioned at the rear of the seat 20. The wheels (with bearings not shown) are supported on fixed axles and are mounted on an underside of the seat 20. The pairs 28a, 28b of wheels glide the seat along the track set 22 of FIG. 2. In some embodiments, rotating axles with bearings (not shown) about the axles could be used. Each of the stations 14a-14h has the seat 20 with a stroke unit device 42 (FIG. 4) attached to a non-obstructive location on the seat, typically on an underside of the seat 20 as shown, where the stroke unit device 42 will not interfere with the rower's motions or sliding of the seat 20. Other locations for the stroke unit device 42, to be affixed to the seat, are feasible. The locations should be selected so as to produce data that can relatively unambiguously detect the three points (the catch, the end and oar entering water) in a rowing stroke, as discussed below.

During rowing, the rear facing seats 20 slide along the track set 22 in reaction to the rower's stroke as the rower pushes her feet against the footboard 26. As mentioned above, a stroke starts when a rower sits at "the catch", the most compressed position of the rower during a stroke. Holding the oar, the rower extends her legs to push her feet against the footboard 26, which causes the seat 20 to slide along the track set 22 towards bow of the rowboat 10 (see FIG. 2 2 for details). The rower using her body and arms finishes the stroke. The rower essentially uses her oar to push water from the bow to the stern of the rowboat 10, propelling the rowboat 10 through the water. A "recovery" portion of the stroke is when the rower takes her blade portion of the oar out of the water and moves the blade portion back towards the stern to start the stroke again. The collective motions of the crew become more efficient and effective in moving the boat through the water when the motions are in sync.

Timing of strokes to achieve synchronized movement centers on a "pace setter" of the rowboat sometimes referred to as "the Stroke or Stroke Rower." All of the other rowers sit behind the Stroke Rower and model their strokes in an attempt to synchronize their strokes to the stroke of the Stroke Rower.

Referring now to FIG. 4, a system 40 provides immediate feedback to rowers regarding synchronization of strokes to a standard. Typically the stroke of the Stroke Rower includes a set of the stroke unit devices 42a-42h that process signals resulting from user movements. These signals are processed to produce timing signals that are used to convey one or more types of immediate feedback directly to the rowers. Each stroke unit device 42a-42h includes an accelerometer circuit 44 that includes a sensor device 44a, an optional band pass filter 44b and an optional amplifier 46c. The accelerometer circuit 44 produces an output that represents changes in acceleration of a user's seat, as the stroke unit devices 42a-42h are attached to the seats 20. Each stroke unit device 42a-42h also includes battery 49 and a wireless transceiver (transmit and receive) device 48 (such as Bluetooth®). The number of stroke units correspond to the number of rowers. The stroke units 42a-42h can vary in complexity according to whether the stroke unit is for the rowers or the Stroke Rower.

In one embodiment, the stroke units 42a-42g are the same and equal the number of rowers, but the Stroke Rower would have a "master stroke unit" 42h. The master stroke unit 42h is similar to stroke units 42a-42g, e.g., including the accelerometer 44, detector 46 short distance transceiver 48 (ex. Bluetooth®) and battery 49, but would also include a controller 47. The master stroke unit 42h produces a signal that is used as the standard (or reference) stroke for each of the rowers seated behind the Stroke Rower, and performs the necessary signal processing that produces the appropriate feedback signals for each of the stroke units 42a-42g.

In another embodiment, each of the stroke units 42a-42g includes the controller device 47 that is coupled to the detector 46 and the wireless transceiver device 48, as was shown for master stroke unit 47h. In some implementations, the function of the detector 46 could be performed in the controller device 47 and, in addition, the stroke units 42a-42h could have analog to digital conversion circuitry (not shown) to convert signals from the accelerometer into digital signals.

In some implementations the stroke units 42a-42g are limited to including just the accelerometer circuit 44 that includes the sensor device 44a (and optional band pass filter 44b and an optional amplifier 46c) the wireless transceiver device 48 and the battery 49. In these implementations, the "master stroke unit" 42h attached to the Stroke Rower's seat would include the processor 47 and perform the necessary signal processing that produces the appropriate feedback signals.

For the various ways of providing feedback, all of the devices 42a-42h involve an accelerometer. An accelerometer as used herein is a device that measures "proper acceleration," that is, the acceleration of a body in its own instantaneous rest frame, in contrast with coordinate acceleration, that is, acceleration in a fixed coordinate system. The accelerometers can be single axis types (detect magnitude and direction in a single direction or multi axis types (detect magnitude and direction in a multiple directions, such as three dimensions)). The accelerometers can be capacitive based or piezoelectric based. Piezoelectric based accelerometers have some advantages over capacitive based in that piezoelectric based accelerometers are more tolerant of environmental conditions and do not require a bias voltage.

The accelerometer measures acceleration and is configured to produce a signal that is a measure of two points in the stroke. The first point that the accelerometer measures is where the rower is at "the catch." The second point that the accelerometer measures is where the rower is at "the finish", i.e., the start and end of the stroke. The wireless transmitting device would allow for this data measurement to be transferred and analyzed to give the rowers feedback on their own stroke timing. The data from the stroke accelerometer unit is compared with the other rower's accelerometer unit data. The "Stroke Difference", either positive or negative, can be used to show whether a rower is early or late in reference to the standard stroke.

Referring now also to FIG. 5, an exemplary potential output 50 from the accelerometer circuit 44 is depicted. The first waveform 52a depicted in this fictitious example is the waveform produced from the catch position to the end of the stroke. The second waveform 52b depicted in this fictitious example is the waveform produced from the end of the stroke to the catch position, i.e., the recovery portion of the stroke.

Referring now also to FIG. 6, one example of timing signals that could be produced by the detector 46 from the exemplary fictitious output (FIG. 5) from the accelerometer circuit 44 is shown. The timing signals are shown as two pulses that correspond to the start "catch" and "end" positions of a stroke. Other configurations of these signals are possible.

In each of the stroke units 42a-42g (assuming that stroke unit 42h is a master unit used by the Stroke Rower and the stroke units do not include the controller), the outputs of the accelerometer circuits 44 in the stroke units 42a-42g are fed to the detectors 46 of the particular one of the stroke units 42a-42g. The detector circuits 46 produce these timing signals (or equivalents) corresponding to measures of these two points in each of the rowers' strokes. These timing signals are fed to the transceivers for transmission to the master stroke unit 42h. The first point of these timing signals is where each of the rowers is at "the catch," (the start of the stroke) and the second point is where each of the rowers is at "the finish," (the end of the stroke). The detector circuits 46 can include comparator circuits that are fed a fixed or variable reference voltage, and which is used to detect when the signal from the accelerometer circuits 44 correspond to the start and end points of the strokes for each of the rowers as measured by the stroke units 42a-42g.

In another embodiment, the stroke units 42a-42g (again assuming that stroke unit 42h is a master unit used by the Stroke Rower and the stroke units do not include controllers or detectors 46), and thus the outputs of the accelerometer circuits 44 in the stroke units 42*a*-42*g* are fed to the transceiver 48 for transmission to the master stroke unit 42*h* for processing.

In each of the embodiments above, the master stroke unit 42*h* receives either the timing signals or the raw data from the accelerometer circuits 44, processes these from each of the stroke units 42*a*-42*g* to produce feedback signals to send to either the stroke units 42*a*-42*g* or feedback devices associated with the stroke units 42*a*-42*g*.

In another embodiment, the stroke units 42*a*-42*g* are similar as the stroke unit 42*h* and include controllers 47 (with or without detectors 46 whose function could be performed by the controllers). The controllers 47 in each of stroke units 42*a*-42*g* receive the stroke signal from the master stroke unit 42*h*, and the timing signal from its corresponding stroke units 42*a*-42*g*, and processes these signals to produce a corresponding feedback signals to send to feedback devices associated with the stroke units 42*a*-42*g*.

Thus, the stroke unit devices 42*a*-42*g* produce signals that correspond to the two points in the rower's strokes, which are compared to the same point in the Stroke Rower's stroke. This comparison is done either by the master stroke unit 42*h* or the stroke unit devices 42*a*-42*g* depending on the specifics of the configuration of the devices.

Either the controller device 47 in the master stroke unit device 42*h* or the controller devices 47 in each the corresponding stroke unit devices 42*a*-42*g* (depending on the configuration) compares the timing signals (corresponding to the start and end of a stroke) to the timing signal from the Stroke Rower's "master stroke unit" 42*h*.

In response to this comparison, either the controller device 47 in the master stroke unit device 42*h* or the controller devices 47 in each the corresponding stroke unit devices 42*a*-42*g* (depending on the configuration) produces an output that indicates whether the rower is ahead, in synch or behind the start of each of the Stroke Rower's strokes; and whether the rower is ahead, in synch or behind the end of each of the Stroke Rower's strokes.

Referring now to FIG. 5A, another exemplary potential output 54 from the accelerometer circuit 44 is depicted. In FIG. 5A are depicted the first fictitious waveform 52*a* produced from the catch position to the end of the stroke and the second fictitious waveform 52*b* produced from the end of the stroke to the catch position, i.e., the recovery portion of the stroke, as in FIG. 5 above.

Another feature of a rower's stroke is the point in the rower's stroke when the rower puts the oar into the water. When the blade of the oar goes into the water, the rower is ideally at $\frac{7}{8}^{ths}$ of the catch position, i.e., $\frac{7}{8}^{ths}$ to the highest compressed position of the rower. The last $\frac{1}{8}^{th}$ to full compression, i.e., to the catch position, is generally slower than or not as smooth as the rest of the stroke. The accelerometer will produce a signal (depicted in FIG. 5A as the disruption or artifact 56) that is a measure of disruption of the stroke, in addition to straightforward catch-finish velocities of the stroke, as in FIG. 5.

As shown in FIG. 6A, this disruption 56 provides another signal by which the rowers can synchronize their strokes. Thus, the approach provides three points of synchronization, the start of a stroke, the end of the stroke, and point at which the oar blade enters into the water.

Figure 7A:
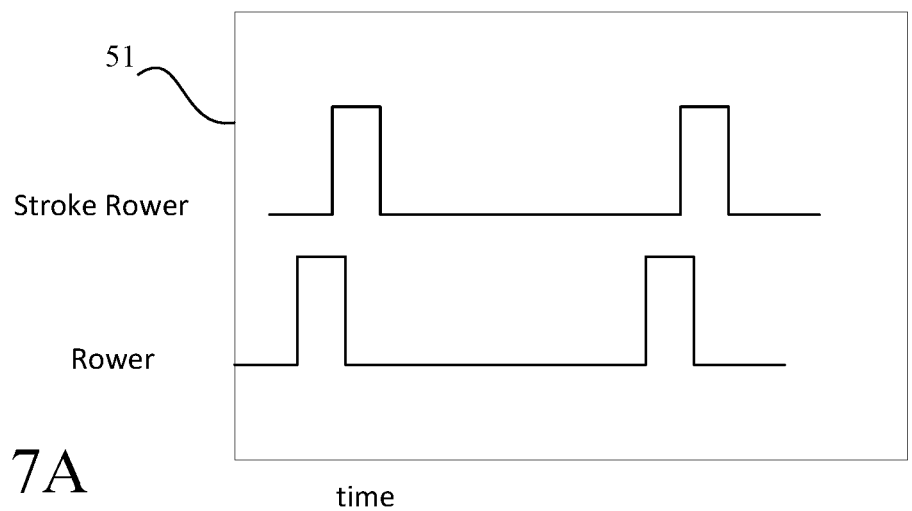
FIGS. 7A-7C are exemplary timing waveforms that may be generated and rendered on a display showing a stroke that is leading, in synch with and lagging relative to a standard (Stroke Rower).
Figure 7B:
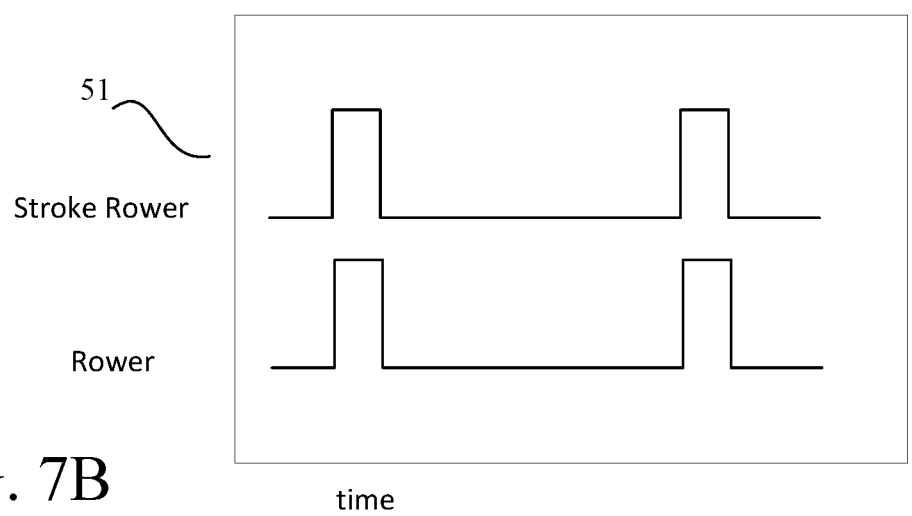
Figure 7C:
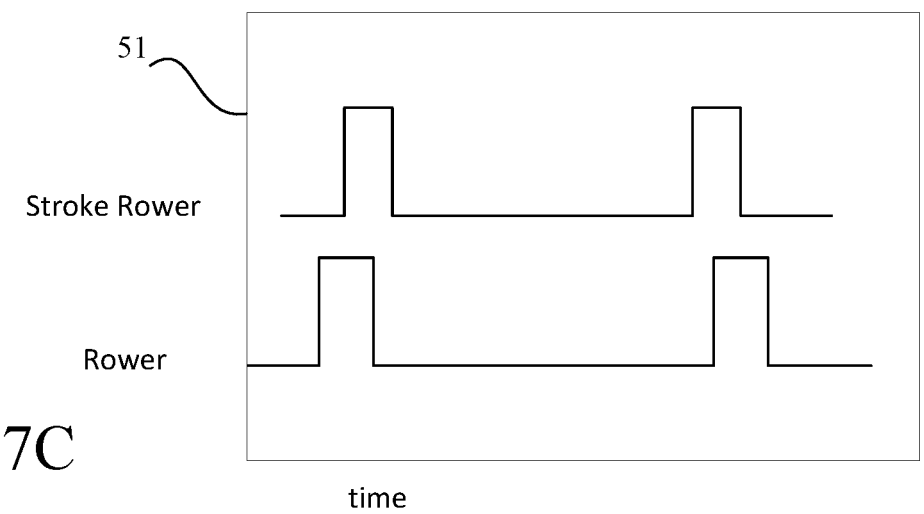

Referring now to FIGS. 7A-7C one of several feedback mechanisms used individually or in one or more combinations to convey stroke differences between a rower and the Stroke Rower is shown. The feedback mechanisms receive either the accelerometer data directly or the produced timing signals and generate signals that are used as feedback to rowers.

In FIGS. 7A-7C is shown a display device 51, as a first mechanism, which conveys feedback, as visual feedback to each of the rowers. There would be a display device 51 at each of the stations 14*a*-14*g*. The display device would render timing information of a rower at a given one of the stations 14*a*-14*g* relative to the timing of the Stroke Rower at station 14*h*. The timing information is determined by processing signals from each of the stroke unit devices 42*a*-42*g* relative to signals from the master stroke device 42*h*. The feedback signals can be produced either by the stroke unit devices 42*a*-42*g* or the Stroke Rower's "master stroke unit" 42*h*, as discussed above. These signals are sent via the transceivers 48 to the displays 51 (directly via a wireless connection or through the stroke unit devices via a wireless connection). The displays could be wired to the devices 42*a*-42*h*.

The display device 51 is attached to the rowboat, one per rower (except the Stroke Rower since she is setting the pace). The display device 51 can be mounted on the rigger 15 in the appropriate rower station 14*a*-14*g*, (as discussed above). One possible placement is to attach the display device to rear member 17*b* of the rigger 15 that is in front of the rower, so that the display is visible at all times.

The display would show the Stroke Difference, indicating to each rower how much each is behind or ahead of the Stroke Rower as shown in FIGS. 7A-7C. Stroke difference is shown as pulse waveforms but other visual displays could be used, e.g., a time value or other type of waveforms or both).

While the Stroke Rower need not have a display, as she is setting the pace, the Stroke Rower could have a display that displays the timing of the Stroke Rower and the timing of each of the rowers. Alternatively, this display 51 could be in the coxswain station 16 and used by the coxswain in coaching the rowers.

Figure 8:
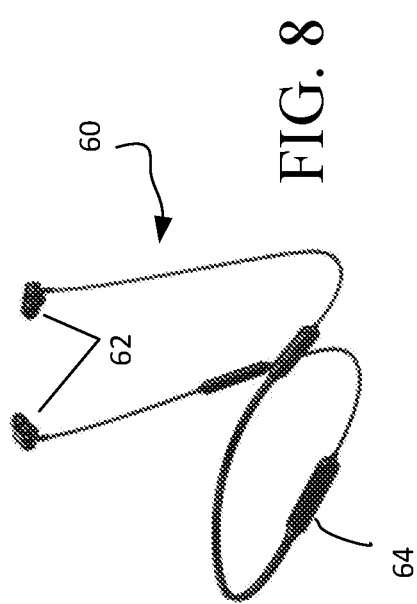
FIGS. 8 and 9 are depictions of exemplary feedback devices.

Referring now to FIG. 8, a second mechanism involves producing audio feedback through, for example, a wireless earphone 60 having earbuds 62 and wireless receiver and volume control 64. The Stroke Rower's point of catch and finish would have one tone, for instance, tone 1. The rowers would have another tone, which would be different from the Stroke Rower's tone, and could be but need not be unique tones among the rowers. The rowers might have tone 2. Each rower would be listening to the Stroke Rower's catch and finish tone 1 and their own catch and finish tone 2. The rower would hear the two tones, one after the other, if the stroke is not in synch. If tone 1 is heard first, the rower is behind the Stroke Rower. If tone 2 is heard first, that rower is ahead of the Stroke Rower. Ideally, perfect synchronicity would be occur when the rower hears one unified tone—a mix between tone 1 and tone 2 at the same time.

Figure 9:
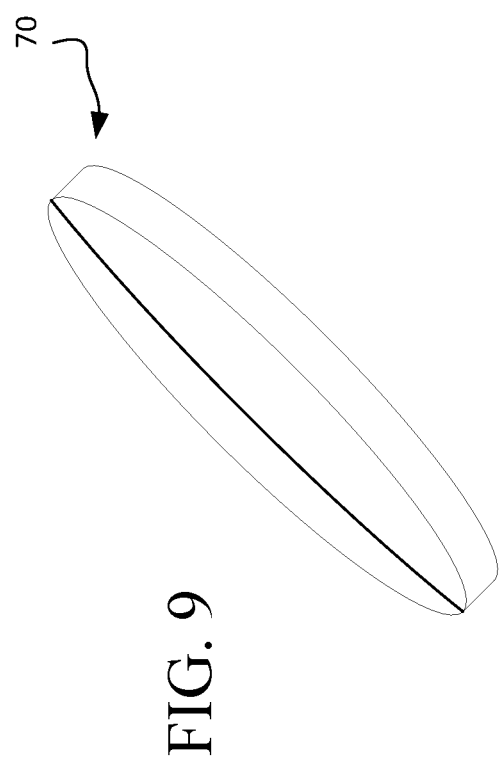

Referring now to FIG. 9, a third mechanism involves producing tactile sensing using a tactile device 70. The tactile device 70 includes an actuator, (not shown) a band, and a wireless receiver (not shown). Alternatively, with a smartwatch, an APP could be downloaded that receives the feedback signals and causes the smartwatch to vibrate according to whether the rower is behind or ahead of the Stroke Rower. One type of vibration to the wrist would mean that the rower is ahead. A second, different type of vibration would mean that the rower is behind. Using these signals, the rower would be able to adjust the stroke. No vibration would indicate that the rower is in synch with the Stroke Rower or a different vibration could be used to indicate synchronization.

One of the advantages in both tactile and audio mechanisms is that these mechanisms, unlike the visual mechanisms, enable visually impaired or blind people to be involved in crews. In addition, with the principles discussed herein, people who are in physically different geographically locations can train together by sending and receiving these signals over the Internet. Even if teammates are not practicing with another teammate at the moment, their stroke timing and other information can be recorded and played back and used by another rower as a "baseline stroke" that the rower is trying to match. That being said, there will also be other sample "baseline strokes" that a user might choose from to help integrate these devices into a rower's practices. After finishing, for example, a five minute piece with a chosen "baseline stroke", the rower can get a score and compare that score with the score of friends or teammates. These scores can be a measure of correct timing.

Figure 10:
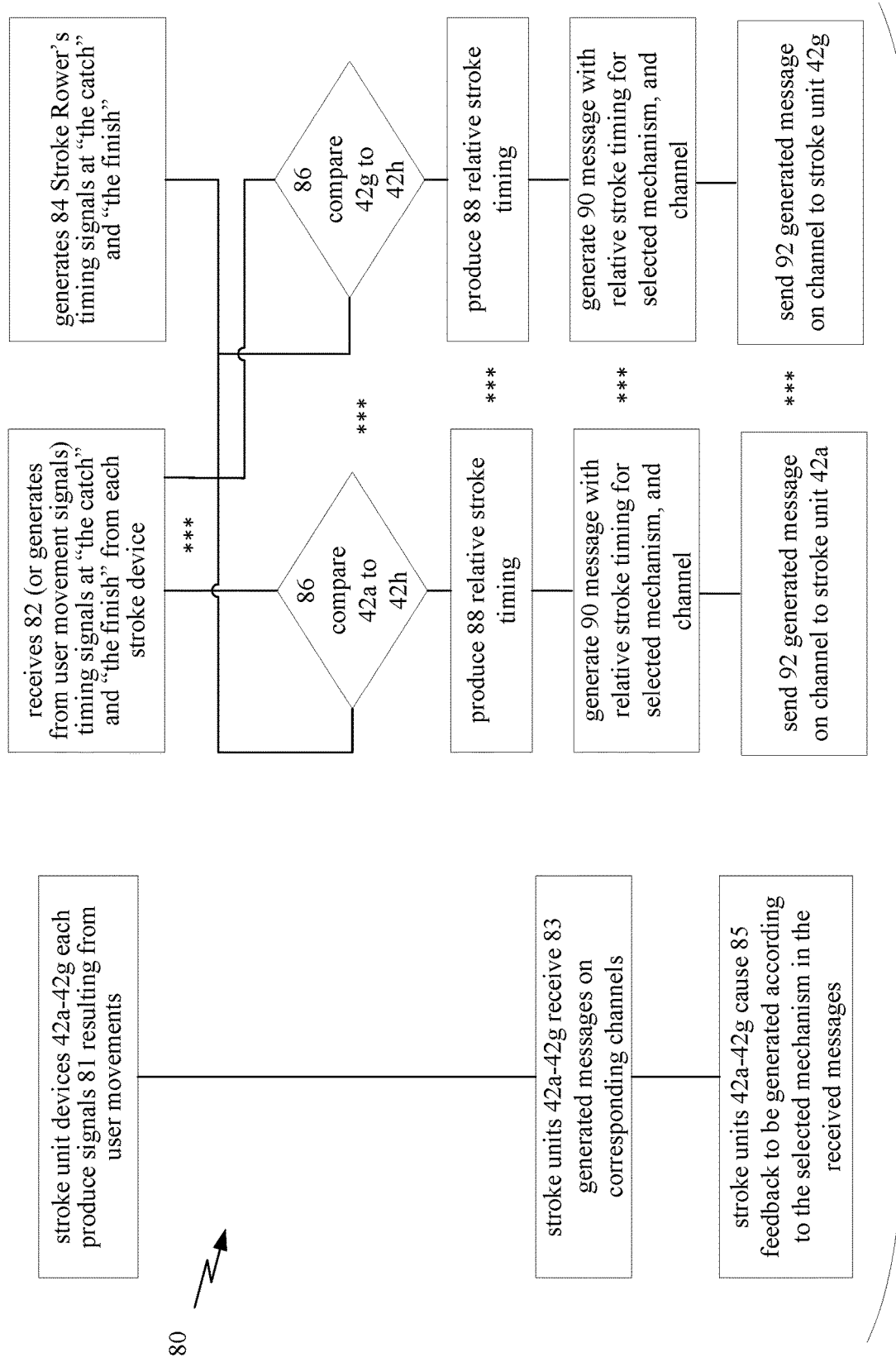
FIG. 10 is a flow chart showing a processing to generate feedback synchronization signals for the feedback devices.

Referring to FIG. 10, processing 80 performed by each of the stroke units 42a-42g and "master stroke unit" 42h for an eight person rowing crew is shown. Timing of strokes to achieve synchronized movement centers on "the Stroke Rower," as mentioned above.

In this embodiment, it is assumed that the stroke units 42a-42g merely detect acceleration and the master stroke unit 42h performs signal processing to produce timing signals and feedback. Thus, in this example, the stroke unit devices 42a-42g can consist of or consist essentially of the accelerometer circuit 44 (with the sensor device 44a and optional band pass filter 44b and optional amplifier 46c), the battery 49 and the wireless transceiver device 48 (and may include the detector) in a package or case (not shown).

The set of stroke unit devices 42a-42g each produce signals 81 resulting from user movements. The stroke unit devices 42a-42g either produce signals generated by accelerometer circuit 44 or timing signals produced by the detector 46 (see FIG. 4). These signals, resulting from user movement, involve a measure of acceleration and are sent to the master stroke device 42h.

The master stroke device 42h receives 82 the signals (either the signals generated by accelerometer circuit 44 to produce the timing signals or timing signals produced by the stroke units 42a-42g). The accelerometer measures acceleration and either the stroke unit devices 42a-42g or the master stroke device 42h is configured to produce measures of the two points in the stroke of each of the rowers, e.g., where the rower is at "the catch" and where the rower is at "the finish", i.e., the start and end of the stroke.

The master stroke device 42h generates 84 a signal corresponding to Stroke Rower's stroke. The master stroke device 42h compares 86 the timing signals (two pulses that correspond to the start and end of a stroke) produced by the each of the stroke devices 42a-42g to the signal produced by the Stroke Rower's "master stroke unit" 42h. (As shown in FIG. 10, the comparison 86 is performed in parallel but it could be performed sequentially.) The Stroke Rower's "master stroke unit" 42h produces 88 relative stroke timing outputs that indicate whether each of the rowers is ahead, in synch, or behind the start of the Stroke Rower's strokes and whether each of the rowers is ahead, in synch, or behind the end of the Stroke Rower's strokes.

The Stroke Rower's "master stroke unit" 42h selects one or more mechanisms to convey stroke differences between a rower and the Stroke Rower. If the selected mechanism is visual, the "master stroke unit" 42h produces visual feedback as in FIGS. 7A-7C. Selection can be an option and thus, in an alternative, the system is configured for just one mechanism.

If the selected mechanism involves producing audio feedback the "master stroke unit" 42h produces audio feedback. The Stroke Rower's point of catch and finish would have one tone that is fetched from a mapping of stroke rower to tones (digital data that produce at least two unique tones). Each of the other rowers would have a unique channel on which a user's tone would be transmitted such that a given rower would hear the user tone and the Stroke Rower's tone. Depending on the relative arrival of the two tones, the user would be able to adjust her stroke, as discussed above.

If the selected mechanism involves producing tactile feedback the "master stroke unit" 42h produces the tactile feedback with one type of vibration (short duration pulses, for example) to indicate that the rower is ahead or another type of vibration (long duration pulses, for example) to indicate that the rower is behind the Stroke Rower's stroke.

The "master stroke unit" 42h produces 90 plural messages for the corresponding stroke units 42a-42g. Each message includes a given channel (that is uniquely paired with one of the stroke units 42a-42g) on which the message will be transmitted 92, as well as feedback data. The stroke units 42a-42g each receive 83 the message and extract the feedback data and render 85 the feedback data using the appropriate feedback device, e.g., display, earphones (or other acoustic device) or tactile actuator.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible nontransitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data including, by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or another unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, subprograms, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Computer-readable media suitable for storing computer program instructions and data include all forms of non-volatile memory on media and memory devices including, by way of example, semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, the devices can be used off the water in "erg training" (e.g., Erg Rowing Workouts using rowing training equipment such as rowing machines). The devices can be used to master timing during practice even when the crews are not on the water. With off the water training, a user can learn the body timing cues of the person in front of them. A rower can master their timing with their partner. The rower can master interactions with the devices by making adjustments in timely response to the signals produced by the devices.

What is claimed is:

1. A computer-implemented method for providing immediate feedback to rowers, the method comprising:

receiving from a set of stroke unit devices data that represent changes in acceleration of users' seats corresponding to users' oars being placed into water;
receiving reference stroke data corresponding to reference user's oar being placed into the water;
generating from the received data from the set of stroke unit devices and the received reference strokes data, feedback data that correspond to relative stroke timing differences relative to the reference stroke; and
transmitting the generated feedback data to user devices according to a feedback mechanism.

2. The method of claim 1 wherein receiving from the set of stroke units and receiving reference stroke data each further comprise:

receiving data corresponding to first changes in acceleration as a measure of a rower at the catch point in the stroke, and the second changes in acceleration as a measure of a rower at the end point of the stroke.

3. The method of claim 1 wherein the generated feedback data indicates whether the rower is ahead, in synch or behind the start of each of the reference strokes.

4. The method of claim 1 wherein the reference strokes are a Stroke Rower's strokes, and the method generates the feedback data for each stroke unit device in the set of stroke unit devices.

5. The method of claim 1 wherein the mechanisms is one or more of a visual feedback mechanism, an audio feedback mechanism and a tactile feedback mechanism.

6. The method of claim 1 wherein the mechanisms is a visual feedback mechanism that is rendered on a display unit mounted on a rigger portion of the rowboat, with the display configured to show a visual indication of a stroke difference, indicating to the corresponding rower how much the rower is behind or ahead of the Stroke Rower.

7. The method of claim 1 wherein the mechanisms is an audio feedback mechanism that is rendered through an acoustic transducer device that is configured to render an indication of a stroke difference as a set of tones.

8. The method of claim 7 wherein the set of tones includes a first tone corresponding to the Stroke Rower's catch and finish points and a second, different tone that corresponds to the rower's catch and finish points.

9. The method of claim 8 wherein the time of arrival of the set of Stroke Rower's tones relative to the time of arrival of the rower's tones determine whether the rower's stroke is ahead of or behind or synchronized with the stoke of the of Stroke Rower.

10. The method of claim 1 wherein the mechanisms is a tactile feedback mechanism that causes a tactical actuator to render a tactile sensation to a user according to whether the rower is behind or ahead of the Stroke Rower.

11. A computer-implemented method for providing immediate feedback to rowers, the method comprising:

receiving from a set of stroke unit devices data that represent changes in acceleration of a user's seat, with a first one of the changes being an indication of a start of a stroke and a second one of the changes being an indication of a completion of a stroke;
receiving data that represent start points of reference strokes and completion points of the reference strokes;
generating from the received data from the set of stroke unit devices and the data that represent the reference strokes, feedback data that correspond to relative stroke timing differences relative to the reference stroke; and
transmitting the generated feedback data to user devices according to a feedback mechanism.

12. The method of claim 11 wherein the first change in acceleration is a measure of a rower at the catch point in the stroke, and the second change in acceleration is a measure of a rower at the end point of the stroke, and the method further includes
receiving from the set of stroke unit devices data that represent changes in acceleration of the users' seats corresponding to users' oars being placed into water;
wherein receiving the reference stroke data further includes data corresponding to reference user's oar being placed into the water; and
generating further includes generating feedback from the received data from the set of stroke unit devices and the data that represent the reference strokes that correspond to relative stroke timing differences at each of the rowers' catch points, end points, and point where the oars are being placed into water relative to the reference stroke catch points, end points, and point where the oars are being placed into water.

13. The method of claim 11 wherein the generated feedback data indicates whether the rower is ahead, in synch or behind the start of each of the reference strokes.

14. The method of claim 11 wherein the reference strokes are a Stroke Rower's strokes, and the method generates the feedback data for each stroke unit device in the set of stroke unit devices.

15. The method of claim 11 wherein the mechanisms is one or more of a visual feedback mechanism, an audio feedback mechanism and a tactile feedback mechanism.

16. The method of claim 11 wherein a first one of the mechanisms is a visual feedback mechanism that is rendered on a display unit mounted on a rigger portion of the rowboat, with the display configured to show a visual indication of a stroke difference, indicating to the corresponding rower how much the rower is behind or ahead of the Stroke Rower.

17. The method of claim 11 wherein a first one of the mechanisms is an audio feedback mechanism that is rendered through an acoustic transducer device that is configured to render an indication of a stroke difference as a set of tones.

18. The method of claim 17 wherein the set of tones includes a first tone corresponding to the Stroke Rower's catch and finish points and a second, different tone that corresponds to the rower's catch and finish points.

19. The method of claim 18 wherein the time of arrival of the set of Stroke Rower's tones relative to the time of arrival of the rower's tones determine whether the rower's stroke is ahead of or behind or synchronized with the stoke of the of Stroke Rower.

20. The method of claim 11 wherein a first one of the mechanisms is a tactile feedback mechanism that causes a tactical actuator to render a tactile sensation to a user according to whether the rower is behind or ahead of the Stroke Rower.

21. An apparatus comprises:
a processor device;
memory operatively coupled to the processor device; and
a storage device storing a computer program product for configuring the device to:
receive from a set of stroke unit devices data that represent changes in acceleration of users' seats corresponding to users' oars being placed into water;
receive reference stroke data corresponding to reference user's oar being placed into the water;
generate from the received data from the set of stroke unit devices and the received reference strokes data, feedback data that correspond to relative stroke timing differences relative to the reference stroke; and
transmit the generated feedback data to user devices according to a feedback mechanism.

22. The apparatus of claim 21 wherein the computer program product further configures the device to:
receive from the set of stroke units and receive reference stroke data that each further includes data corresponding to first changes in acceleration as a measure of a rower at the catch point in the stroke, and the second changes in acceleration as a measure of a rower at the end point of the stroke.

23. The apparatus of claim 21 wherein the generated feedback data indicates whether the rower is ahead, in synch or behind the start of each of the reference strokes.

24. The apparatus of claim 21 wherein the apparatus is a Stroke Rower master stroke unit and the reference strokes are a Stroke Rower's strokes, and the apparatus generates the feedback data for each stroke unit device in the set of stroke unit devices.

25. The apparatus of claim 21 wherein the mechanisms is one or more of a visual feedback mechanism, an audio feedback mechanism and a tactile feedback mechanism.

26. The apparatus of claim 25 wherein the apparatus further comprises circuitry to render at least one of the feedback mechanisms.

27. The apparatus of claim 21 wherein the mechanisms is an audio feedback mechanism, and the apparatus is further configured to:
produce a set of tones, the set of tones includes a first tone corresponding to the Stroke Rower's oar placement in the water, catch and finish points and a second, different tone that corresponds to the rower's oar placement in the water, catch and finish points.

28. A computer program product tangibly stored on a non-transitory hardware storage device the computer program product comprising executable instructions to cause an apparatus to:
receive from a set of stroke unit devices data that represent changes in acceleration of users' seats corresponding to users' oars being placed into water;
receive reference stroke data corresponding to reference user's oar being placed into the water;
generate from the received data from the set of stroke unit devices and the received reference strokes data, feedback data that correspond to relative stroke timing differences relative to the reference stroke; and
transmit the generated feedback data to user devices according to a feedback mechanism.

29. The computer program product of claim 28 wherein the computer program product further comprises instructions to cause the apparatus to:
receive from the set of stroke units and receive reference stroke data that each further includes data corresponding to first changes in acceleration as a measure of a rower at the catch point in the stroke, and the second changes in acceleration as a measure of a rower at the end point of the stroke.

30. The computer program product of claim 28 wherein the feedback mechanisms is one or more of a visual feedback mechanism, an audio feedback mechanism and a tactile feedback mechanism.

* * * * *